United States Patent
Sutterfield et al.

(10) Patent No.: US 10,655,539 B2
(45) Date of Patent: May 19, 2020

(54) AIRCRAFT ANTI-ICING SYSTEM

(71) Applicant: Rolls-Royce North American Technologies, Inc., Indianapolis, IN (US)

(72) Inventors: David Levi Sutterfield, Greenwood, IN (US); Christopher J. Bies, Zionsville, IN (US); Mark O'Leary, Zionsville, IN (US)

(73) Assignee: Rolls-Royce North America Technologies Inc., Indianapolis, IN (US)

( * ) Notice: Subject to any disclaimer, the term of this patent is extended or adjusted under 35 U.S.C. 154(b) by 394 days.

(21) Appl. No.: 15/785,003

(22) Filed: Oct. 16, 2017

(65) Prior Publication Data
US 2019/0112980 A1   Apr. 18, 2019

(51) Int. Cl.
  *F02C 7/047*  (2006.01)
  *B64D 15/04*  (2006.01)
  *B64D 15/12*  (2006.01)
  *B64D 29/00*  (2006.01)

(52) U.S. Cl.
  CPC .............. *F02C 7/047* (2013.01); *B64D 15/04* (2013.01); *B64D 15/12* (2013.01); *B64D 29/00* (2013.01); *F05D 2260/602* (2013.01)

(58) Field of Classification Search
  CPC ........ B64D 15/04; B64D 15/12; B64D 29/00; F02C 7/047; F05D 2260/602
  See application file for complete search history.

(56) References Cited

U.S. PATENT DOCUMENTS

| | | | |
|---|---|---|---|
| 2,435,990 A | | 2/1948 | Weiler |
| 2,655,308 A | | 10/1953 | Luttman |
| 3,057,154 A | | 10/1962 | Sherlaw |
| 3,917,193 A | * | 11/1975 | Runnels, Jr. ............. B64C 9/24 244/207 |
| 3,933,327 A | * | 1/1976 | Cook .................... B64D 15/04 244/134 B |
| 4,738,416 A | * | 4/1988 | Birbragher ............. B64D 15/04 244/134 B |
| 4,976,397 A | | 12/1990 | Rudolph |
| 6,027,078 A | * | 2/2000 | Crouch ................... B64C 21/00 244/130 |

(Continued)

FOREIGN PATENT DOCUMENTS

| | | | | |
|---|---|---|---|---|
| CA | 2945332 A1 | * | 4/2017 | .............. F02K 3/06 |
| EP | 3115298 A1 | * | 1/2017 | .............. F02C 7/047 |

(Continued)

*Primary Examiner* — Assres H Woldemaryam
*Assistant Examiner* — Nicholas E Brown
(74) *Attorney, Agent, or Firm* — Barnes & Thornburg LLP (57) ABSTRACT

Various embodiments of the present disclosure provide an aircraft anti-icing system that includes an aircraft engine inlet component, a pressurized air source, and a heat source operable to: (1) heat the leading edge of the aircraft engine inlet component via the heat source to prevent ice formation on the outer surface of the leading edge; and (2) direct pressurized air from the pressurized air source so that it forces water off of the outer surface of the inlet components (and into the external air flow) as the water travels downstream from the leading edge outer surface downstream toward the trailing edge, which prevents runback ice formation.

19 Claims, 7 Drawing Sheets

(56) References Cited

U.S. PATENT DOCUMENTS

| | | | | |
|---|---|---|---|---|
| 7,469,862 B2* | 12/2008 | Layland | ............. | B64D 15/12 244/134 D |
| 7,513,458 B2* | 4/2009 | Layland | ............. | B64D 15/12 244/134 D |
| 8,434,724 B2* | 5/2013 | Chelin | ............. | B64C 21/04 244/134 B |
| 8,967,543 B2* | 3/2015 | Saito | ............. | F01D 25/02 239/599 |
| 2007/0084969 A1* | 4/2007 | Ellstrom | ............. | B64D 15/04 244/135 R |
| 2011/0120076 A1* | 5/2011 | Vauchel | ............. | B64D 15/12 60/39.093 |
| 2013/0192248 A1* | 8/2013 | Ackermann | ............. | F02C 7/141 60/779 |
| 2013/0263601 A1* | 10/2013 | Richardson | ............. | B64D 33/02 60/722 |
| 2015/0034767 A1* | 2/2015 | Pirat | ............. | B64D 15/04 244/134 B |
| 2016/0108754 A1* | 4/2016 | Herbaut | ............. | B64D 15/12 415/121.3 |
| 2016/0169411 A1* | 6/2016 | Fahrner | ............. | F16K 49/002 137/15.18 |
| 2016/0200442 A1* | 7/2016 | Jones | ............. | F16K 31/1223 244/134 R |
| 2016/0257413 A1* | 9/2016 | Newman | ............. | F02C 7/047 |
| 2017/0210477 A1 | 7/2017 | Mackin | | |
| 2017/0268430 A1* | 9/2017 | Schwarz | ............. | B64D 13/06 |
| 2017/0313428 A1* | 11/2017 | Mackin | ............. | B64D 15/04 |
| 2017/0334566 A1* | 11/2017 | Goodman | ............. | B64D 15/04 |
| 2018/0058322 A1* | 3/2018 | Alstad | ............. | B64D 15/04 |
| 2018/0170557 A1* | 6/2018 | Lorenz | ............. | B64D 15/12 |
| 2018/0192476 A1* | 7/2018 | Chaudhry | ............. | B64D 15/12 |
| 2019/0193863 A1* | 6/2019 | Abdollahzadehsangroudi | ............. | H05B 6/62 |

FOREIGN PATENT DOCUMENTS

| | | | | |
|---|---|---|---|---|
| EP | 3216697 A1 * | 9/2017 | ............. | F02C 6/06 |
| FR | 2980775 A1 * | 4/2013 | ............. | F02K 1/46 |
| FR | 3055612 A1 * | 3/2018 | ............. | B64D 15/04 |
| WO | WO-9306005 A1 * | 4/1993 | ............. | F02C 7/047 |
| WO | WO-2006136748 A2 * | 12/2006 | ............. | F02C 7/047 |

* cited by examiner

AIRCRAFT ANTI-ICING SYSTEM

FIELD

The present disclosure relates to aircraft anti-icing systems, and specifically to anti-icing systems for de-icing and preventing ice formation on aircraft engine inlet components, such as inlet guide vanes or the inlet cowl of a nacelle.

BACKGROUND

An aircraft turbine engine typically includes an inlet guide vane assembly. The inlet guide vane assembly includes an annular outer frame, a coaxial annular inner frame, and multiple aircraft engine inlet guide vanes (sometimes referred to herein as "guide vanes" for brevity). The guide vanes are mounted between the inner and outer frames such that they extend radially from the inner frame to the outer frame and are circumferentially arranged around the common axis of the inner and outer frames. The inlet guide vane assembly is mounted between the leading edge of the inlet cowl of the nacelle of the engine and the turbomachinery of the engine so that the guide vanes are circumferentially arranged around the rotational axis of the engine. The guide vanes are shaped, positioned, and oriented to direct air flow to provide a desired air flow pattern into the turbomachinery of the engine during flight.

Figure 1A:
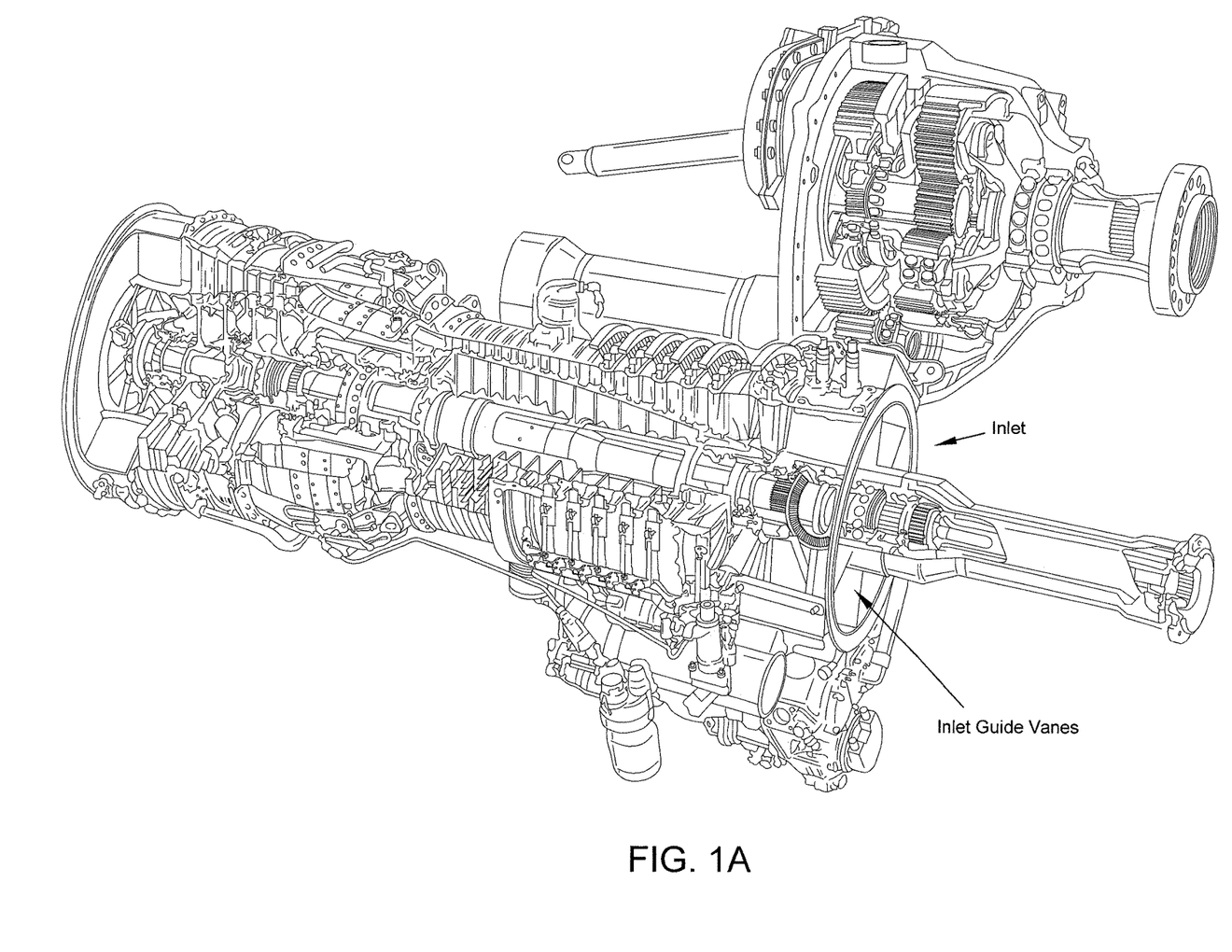
FIG. 1A is a perspective and partial cutaway view of a prior art aircraft turbine engine.
Figure 1B:
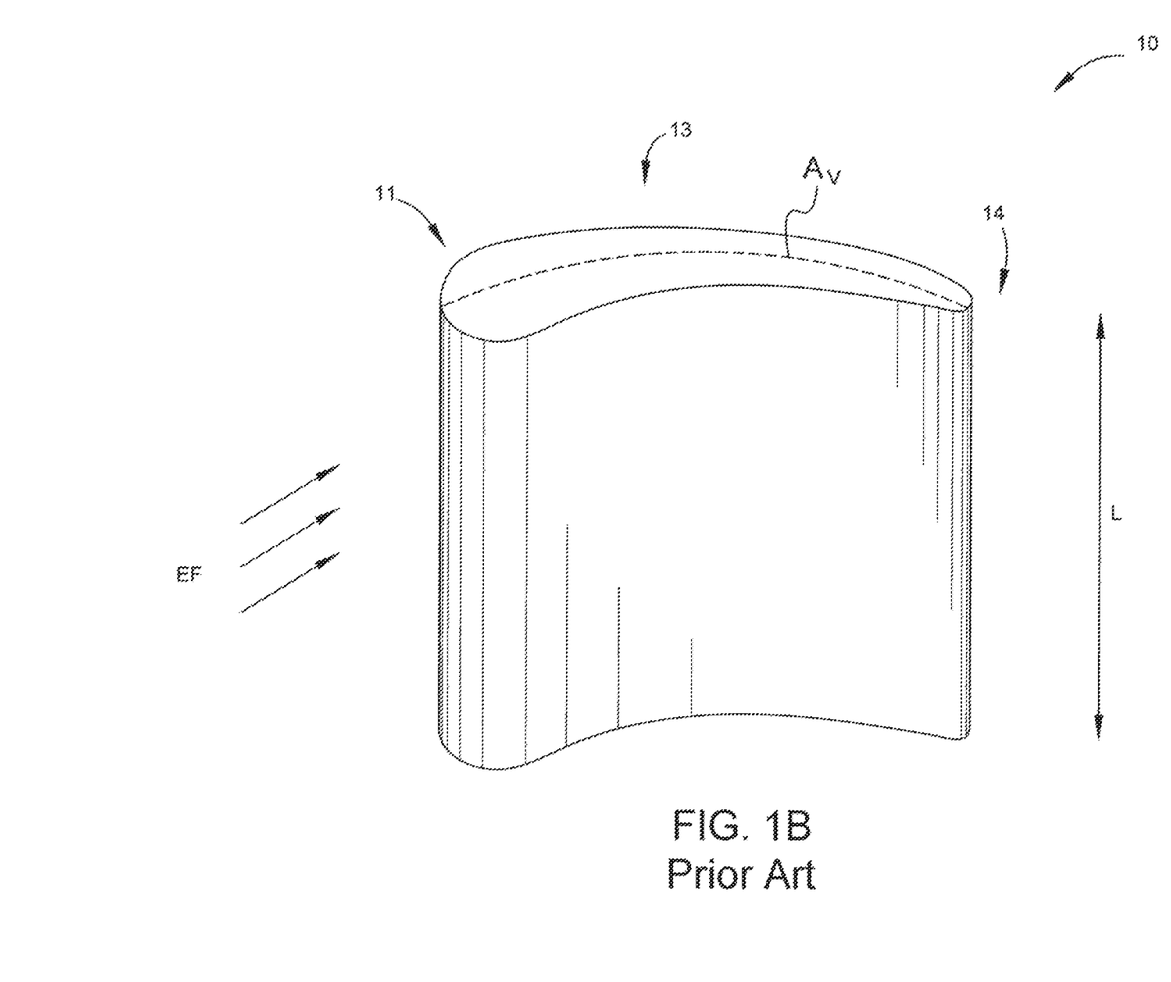
FIG. 1B is a perspective view of a prior art guide vane.

FIG. 1A shows a prior art aircraft turbine engine 1 including an inlet guide vane assembly 2 including multiple guide vanes 10. FIG. 1B shows one of the prior art guide vanes 10 having a radial dimension L. The guide vane 10 includes a leading edge member 11, a trailing edge member 14, and a body member 13 between the leading edge member 11 and the trailing edge member 14 and including opposing side walls that connect the leading edge member 11 and the trailing edge member 14. The guide vane 10 is attached to the inner and outer frames such that its radial dimension L extends between the inner and outer frames. The guide vane 10 is oriented so that while the aircraft is flying the external air flow EF impinges on and flows downstream past the leading edge member 11 of the guide vane 10.

When an aircraft flies in certain atmospheric conditions (like cold weather and heavy cloud cover or fog), ice tends to form and build up on parts of the aircraft on which air impinges, such as the guide vanes. The ice build-up partially (or sometimes completely) fills the gaps between adjacent guide vanes. This degrades the performance of the engine by reducing air intake and/or causing the guide vanes to provide an undesired air flow pattern. The engine is also susceptible to severe damage if a large enough chunk of ice breaks off of a guide vane, travels into the turbomachinery, and contacts its moving components (such as the turbine or the compressor blades).

Even if the leading edge member of a guide vane is heated enough to melt the built-up ice into water, the external air flow forces that water to travel downstream off of the leading edge member and onto the body member of the guide vane. Since the water no longer contacts the warm leading edge member, the water promptly refreezes, and ice build-up resumes. This phenomenon is called runback icing, and simply shifts the ice formation and build-up problem downstream from the leading edge member.

SUMMARY

Various embodiments of the present disclosure provide an aircraft anti-icing system includes an aircraft engine inlet component, a pressurized air source, and a heat source that solves the above-described problems by: (1) heating the leading edge of the aircraft engine inlet component via the heat source to melt existing ice on and/or prevent ice formation on the outer surface of the leading edge; and (2) directing pressurized air from the pressurized air source so that it forces water off of the outer surface of the inlet components (and into the external air flow) as the water travels downstream from the leading edge outer surface downstream toward the trailing edge, which prevents runback ice formation.

In one embodiment, an aircraft engine inlet component comprises a leading edge having an exterior surface and an interior surface, a plenum at least partially bound by the interior surface of the leading edge, and a conduit defining a fluid flowpath between the plenum and the exterior surface of the leading edge. The plenum is fluidly connectable to a pressurized air source.

In another embodiment, a system for melting ice or preventing ice formation comprises a pressurized air source and an aircraft engine inlet component. The aircraft engine inlet component comprises a leading edge comprising an apex, a first surface extending downstream from the apex, and a second surface extending downstream from the apex; a plenum at least partially bound by the leading edge and in fluid communication with the pressurized air source to receive pressurized air from the pressurized air source; and a conduit defining a fluid flowpath between the plenum and the exterior of the component to enable the pressurized air to escape from the plenum to the exterior of the component. The conduit intersects the first surface of the leading edge.

In another embodiment, an aircraft engine inlet component comprises a leading edge comprising a leading edge outer surface and a leading edge inner surface, a first side wall connected to the leading edge, a second side wall opposite the first side wall and connected to the leading edge, and an air director having an inlet and an outlet. The leading edge and the first and second side walls at least partially form an interior vane cavity including a plenum adjacent the leading edge inner surface. The outlet of the air director is in fluid communication with the plenum. The plenum is in fluid communication with the atmosphere via a first conduit adjacent the first side wall and a second conduit adjacent the second side wall.

In another embodiment, a turbine engine comprises a nacelle defining an interior cavity, turbomachinery disposed within the interior cavity of the nacelle, and an guide vane assembly within the interior cavity of the nacelle upstream of the turbomachinery. The guide vane assembly comprises multiple circumferentially arranged and radially extending guide vanes. Each guide vane comprises a leading edge comprising a leading edge outer surface and a leading edge inner surface, a first side wall connected to the leading edge, a second side wall opposite the first side wall and connected to the leading edge, and an air director having an inlet and an outlet. The leading edge and the first and second side walls at least partially form an interior vane cavity including a plenum adjacent the leading edge inner surface. The outlet of the air director is in fluid communication with the plenum. The plenum is in fluid communication with the atmosphere via a first conduit adjacent the first side wall and a second conduit adjacent the second side wall.

In another embodiment, a method for melting ice or preventing ice formation on a leading edge of an aircraft engine inlet component comprises heating the leading edge of the aircraft engine inlet component so that aerodynamic forces effect the flow of water along an exterior surface of the leading edge to an area downstream of an apex of the leading edge and directing air from a plenum within the interior of the aircraft engine inlet component to the area downstream of the apex to force the water away from the exterior surface of the leading edge.

In another embodiment, a method for melting ice or preventing ice formation on a leading edge of an aircraft engine inlet component comprises heating the leading edge, which comprises a leading edge outer surface and a leading edge inner surface, so that aerodynamic forces effect the flow of water along the leading edge outer surface to an exit aperture of a conduit, the exit aperture positioned downstream of an apex of the leading edge; directing pressurized air into a plenum within the leading edge; and directing the pressurized air from the plenum through the conduit and out of the exit aperture to force the water away from the exterior surface of the leading edge.

DETAILED DESCRIPTION

While the features, methods, devices, and systems described herein may be embodied in various forms, the drawings show and the detailed description describes some exemplary and non-limiting embodiments. Not all of the components shown and described in the drawings and the detailed descriptions may be required, and some implementations may include additional, different, or fewer components from those expressly shown and described. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

Various embodiments of the present disclosure provide an aircraft anti-icing system includes an aircraft engine inlet component (sometimes referred to as "inlet component"), a pressurized air source, and a heat source that solves the above-described problems by: (1) heating the leading edge of the aircraft engine inlet component via the heat source to melt existing ice on or prevent ice formation on the outer surface of the leading edge; and (2) directing pressurized air from the pressurized air source so that it forces water off of the outer surface of the inlet components (and into the external air flow) as the water travels downstream from the leading edge outer surface downstream toward the trailing edge, which prevents runback ice formation.

In the example embodiments show in FIGS. 2-5B, the inlet component includes an aircraft engine inlet guide vane (sometimes referred to as the "inlet guide vane"). As described below, the components described below and illustrated in the drawings may be included in any other suitable aircraft engine inlet components to de-ice and prevent ice formation on the leading edges of those inlet components.

Figure 2:
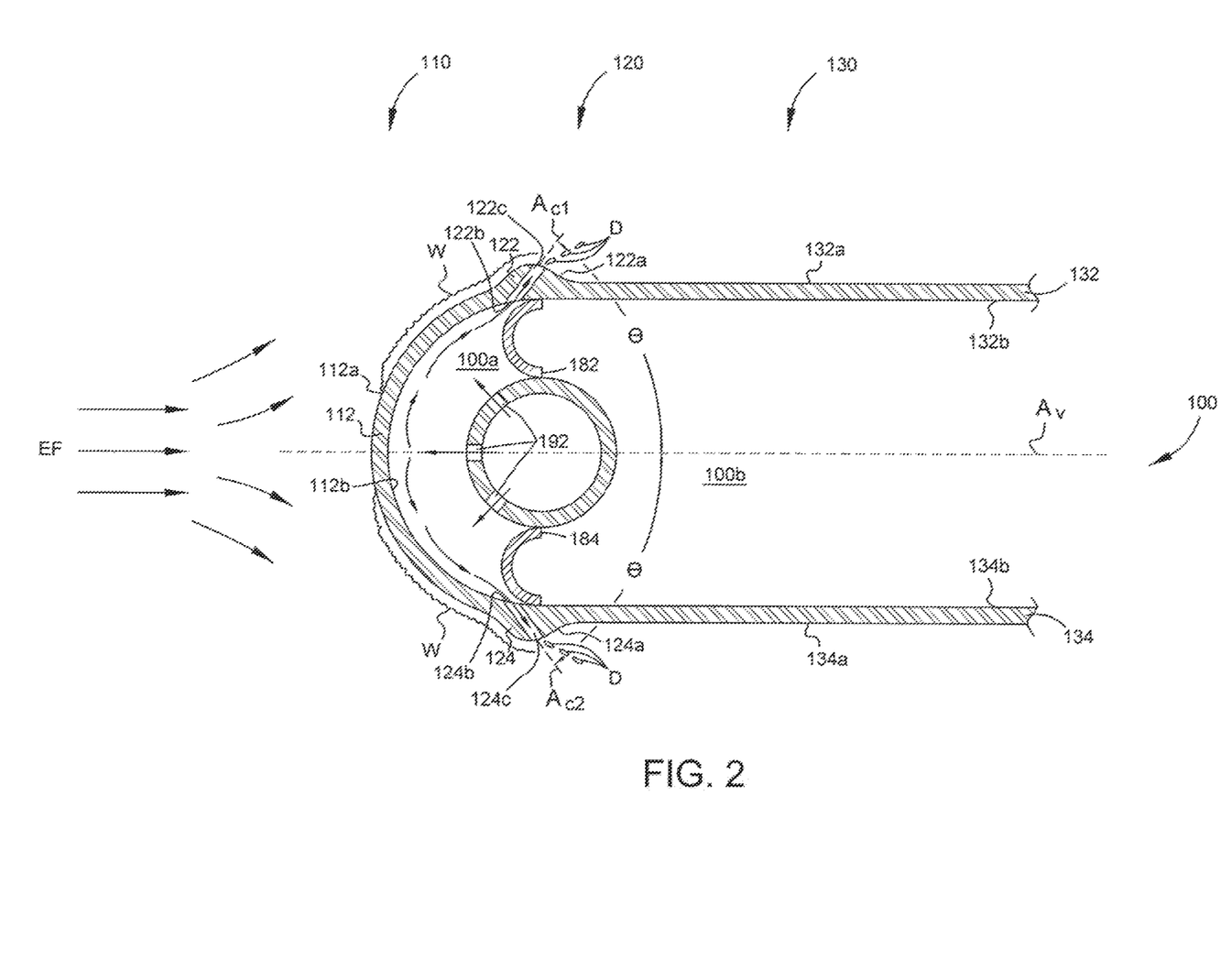
FIG. 2 is a partial cross-sectional view of one example embodiment of the anti-icing aircraft engine inlet guide vane of one embodiment of the aircraft anti-icing system of the present disclosure.

FIG. 2 is a partial cross-sectional view of one example embodiment of the inlet guide vane 100 of one example embodiment of the aircraft anti-icing system of the present disclosure. The cross-section is taken along a plane perpendicular to the radial dimension of the guide vane 100. In this embodiment, the guide vane 100 has a uniform cross-section along its radial dimension (though the cross-section of the guide vane may vary along its radial dimension in other embodiments).

The guide vane 100 includes a leading edge member 110, a body member (not shown), a trailing edge member (not shown), first and second sealing components 182 and 184, and an air director 190. The leading edge member 110, the body member, and the trailing edge member are connected to one another to define an interior cavity within the guide vane 100. As described below, the first and second sealing components 182 and 184 and the air director 190 are configured, positioned, and oriented to divide the interior cavity into a plenum 100a and a cavity 100b.

The leading edge member 110 includes a curved leading edge 112, a first ramp 122, a second ramp 124, and first and second opposing side walls 132 and 134. The leading edge 112 has a convex leading edge outer surface 112a and a concave leading edge inner surface 112b and extends along the radial dimension of the guide vane 100 (i.e., into and out of the page with respect to the orientation shown in FIG. 2). The first and second ramps 122 and 124 and the first and second side walls 132 and 134 also extend along the radial dimension of the guide vane 100.

The first ramp 122 includes a first ramp outer surface 122a and a first ramp inner surface 122b. The first ramp 122 includes a suitably shaped and sized surface (not labeled) that defines a first air escape conduit 122c between the first ramp inner and outer surfaces 122a and 122b. The first air escape conduit 122c is in fluid communication with the plenum 100a and the atmosphere (and thus fluidly connects the plenum 100a to the atmosphere). The first air escape conduit 122c has a longitudinal axis $A_{C1}$ that forms an angle $\theta$ with respect to a central axis $A_V$ of the guide vane 100. For the purposes of this example embodiment, the central axis $A_V$ is an axis that laterally bisects the guide vane 100 and extends from the lateral center of the leading edge 112 (which is its apex as shown in FIG. 2) of the guide vane 100 to the lateral center of the trailing edge of the guide vane 100 (not shown) (also called the mean camber line). The angle $\theta$ may be any suitable angle of 90 degrees or less. In certain embodiments, the angle $\theta$ is less than 25 degrees. Put differently, the first air escape conduit 122c is angled axially rearward.

The second ramp 124 includes a second ramp outer surface 124a and a second ramp inner surface 124b. The second ramp 124 includes a suitably shaped and sized surface (not labeled) that defines a second air escape conduit 124c between the second ramp inner and outer surfaces 124a and 124b. The second air escape conduit 124c is in fluid communication with the plenum 100a and the atmosphere (and thus fluidly connects the plenum 100a to the atmosphere). The second air escape conduit 124c has a longitudinal axis $A_{C2}$ that forms the angle θ with respect to the central axis $A_V$ of the guide vane 100. Put differently, the second air escape conduit 124c is angled axially rearward. In other embodiments, the longitudinal axes of the first and second air escape conduits form different angles with respect to the central axis of the guide vane.

Each air escape conduit may extend any suitable length along the radial direction of the guide vane. For instance, an air escape conduit may extend along substantially the entire radial distance of the guide vane to form a generally continuous slot. In other embodiments, the ramps include multiple suitably sized and shaped surfaces along their respective radial dimensions that define additional air escape conduits spaced apart at suitable intervals. The cross sections of the air escape conduits may take any suitable shape, such as a circular shape, an oval shape, or a rectangular shape. In some embodiments, the air escape conduits taper outward moving from the ramp inner surface to the ramp outer surface such that the air escape conduit inlet has a smaller area than the air escape conduit outlet (or vice-versa).

The first side wall 132 includes a first side wall outer surface 132a and a first side wall inner surface 132b. The second side wall 134 includes a second side wall outer surface 134a and a second side wall inner surface 134b.

In this example embodiment, the leading edge 112, the first and second ramps 122 and 124, and the first and second side walls 132 and 134 are integrally formed with one another (though in other embodiments some or all of these portions may be separate components attached to one another in any suitable manner). Additionally, in this example embodiment, the leading edge member 110, the body member, and the trailing edge member are integrally formed with one another (though in other embodiments some or all of these portions may be separate components attached to one another in any suitable manner).

On one side of the central axis $A_V$ of the guide vane 100, the leading edge outer surface 112a transitions into the first ramp outer surface 122a, which transitions into the first side wall outer surface 132a, which transitions into a trailing edge outer surface (not shown). Similarly, on the other side of the central axis $A_V$ of the guide vane 100, the leading edge outer surface 112a transitions into the second ramp outer surface 124a, which transitions into the second side wall outer surface 134a, which transitions into the trailing edge outer surface. These outer surfaces collectively form a vane outer surface, and are integrally formed with one another in this example embodiment (though they may not be in other embodiments). On one side of the central axis $A_V$ of the guide vane 100, the leading edge inner surface 112b transitions into the first ramp inner surface 122b, which transitions into the first side wall inner surface 132b, which transitions into a trailing edge inner surface. Similarly, on the other side of the central axis $A_V$ of the guide vane 100, the leading edge inner surface 112b transitions into the second ramp inner surface 124b, which transitions into the second side wall inner surface 134b, which transitions into the trailing edge inner surface. These inner surfaces collectively form a vane inner surface, and are integrally formed with one another in this example embodiment (though they may not be in other embodiments).

The first ramp outer surface 122a extends outward from the leading edge outer surface 112a and the first side wall outer surface 132a to form a first ramp apex (not labeled). The distance between the first ramp inner surface 122b and the first ramp apex when measured perpendicularly from the first ramp inner surface 122b is greater than the distance between the leading edge inner surface 112b and the leading edge outer surface 112a and the distance between the first side wall inner surface 132a and the first side wall outer surface 132b. Put differently, the thickness of the first ramp 122 measured at its apex is greater than the thickness of the leading edge 112 and the thickness of the first side wall 132.

The second ramp outer surface 124a extends outward from the leading edge outer surface 112a and the second side wall outer surface 134a to form a second ramp apex (not labeled). The distance between the second ramp inner surface 124b and the second ramp apex when measured perpendicularly from the second ramp inner surface 124b is greater than the distance between the leading edge inner surface 112b and the leading edge outer surface 112a and the distance between the second side wall inner surface 134a and the second side wall outer surface 134b. Put differently, the thickness of the second ramp 124 measured at its apex is greater than the thickness of the leading edge 112 and the thickness of the second side wall 134.

The air director 190—here a tube—is within the interior vane cavity and is oriented such that its longitudinal axis extends along the radial dimension of the guide vane 100. The first sealing component 182 is disposed between and sealingly engages the air director 190 and the first side wall inner surface 132b and is oriented such that its longitudinal axis extends along the radial dimension of the guide vane 100. The second sealing component 184 is disposed between and sealingly engages the air director 190 and the second side wall inner surface 134b and is oriented such that its longitudinal axis extends along the radial dimension of the guide vane 100. This configuration forms the plenum 100a and the cavity 100b, which are not in fluid communication with one another (though they may be in other embodiments).

The air director 190 defines a hot air inlet (not shown) that is fluidly connectable to a pressurized hot air supply (not shown), which is the pressurized air source and the heat source of this example embodiment of the aircraft anti-icing system. The air director 190 also includes suitably sized and shaped surfaces (not shown) that define multiple hot air outlet apertures 192 that are in fluid communication with the plenum 100a (but not with the cavity 100b). The air director may include any suitable quantity of one or more hot air outlet apertures positioned in any suitable manner along its radial dimension and may take any suitable shape and size. In this example embodiment, the pressurized hot air supply is bleed air directed from the engine via suitable tubing, valves, and other devices as is known in the art. In other embodiments, rather than use engine bleed air as the pressurized hot air supply, the aircraft includes a pump, a heating device, and other suitable devices configured to generate the requisite pressurized hot air.

In operation, when the aircraft is flying in conditions that render the guide vane 100 susceptible to ice formation and build-up, an operator fluidly connects the air director 190 to the pressurized hot air supply, such as by controlling a suitable valve to open to enable the hot air (such as the engine bleed air) to flow into the air director 190. The hot air travels through the air director 190 and exits the air director 190 through the hot air outlet apertures 192 into the plenum 100a. The pressure of the hot air is high enough to cause the hot air to fill the plenum 100a and impinge onto the leading edge inner surface 112b. From there, the hot air flows along the curvature of the leading edge inner surface 112b toward the first and second ramp inner surfaces 122b and 124b before exiting the plenum 100a through the first and second air escape conduits 122c and 124c to the atmosphere.

While in the plenum 100a, the hot air heats the leading edge inner surface 112b via convection. The temperature of the hot air is high enough to heat the leading edge outer surface 112a to cause any ice already formed on the leading edge outer surface 112a to melt into water W that accumulates on the leading edge outer surface 112a. While the pressurized hot air supply is fluidly connected to the air director 190, the atmospheric conditions as well as the conditions in the plenum 100a typically cause additional water W to accumulate on the leading edge outer surface 112a rather than freezing. As the aircraft continues moving, the water W that accumulates on the leading edge outer surface 112a is forced downstream along the leading edge outer surface 112a and onto the first and second ramp outer surfaces 122a and 124a toward the first and second air escape conduits 122c and 124c. In this example embodiment, the ramp outer surfaces 122a and 124a are sized, oriented, and positioned (e.g., extend substantially along the radial dimension of the guide vane) such that the water W cannot travel around the ramps to avoid crossing paths with the air escaping from the first and second air escape conduits 122c and 124c (described below).

The air escape conduits 122c and 124c are sized, oriented, and positioned such that the water W reaches exit apertures of the air escape conduits 122c and 124c before it freezes along the leading edge outer surface 112a, the first ramp outer surface 122a, or the second ramp outer surface 124a. The air exiting the plenum 100a through the exit apertures of the air escape conduits 122c and 124c forces the water W off of the first and second ramp outer surfaces 122a and 124a and becomes entrained in the external flow as droplets D, which flow downstream through the turbomachinery.

The aircraft anti-icing system including the guide vane 100 solves the above-described problems. The use of the air director 190 to direct hot air into the plenum 100a heats the leading edge 112 to melt existing ice on and/or prevent ice formation on the leading edge outer surface 112a. Also, enabling the pressurized hot air to escape the plenum 100a via the first and second air escape conduits 122c and 124c so that it forces water off of the outer surface of the guide vane (and into the external air flow) as the water travels downstream from the leading edge outer surface 112a toward the trailing edge prevents runback ice formation.

The geometry of the first and second ramp outer surfaces 122a and 124a along with the location of the air escape conduits 122c and 124c relative to the first and second ramp outer surfaces 122a and 124a aids in dispersing the water off of the first and second ramp outer surfaces 122a and 124a. The first and second ramp outer surfaces 122a and 124a are steeper relative to the leading edge outer surface 112a (at the areas where the leading edge outer surface 112a transitions into the first and second ramp outer surfaces 122a and 124a). This means that the velocity component of the water in the direction perpendicular to the central axis $A_V$ (i.e., in the direction away from the first and second ramp outer surfaces 122a and 124a) increases when it travels downstream from the leading edge outer surface 112a onto the first and second ramp outer surfaces 122a and 124a toward the air escape conduits 122c and 124c. The outlets of the first and second air escape conduits are positioned such that they intersect with the respective apexes of the first and second ramps 122 and 124. This means that the hot air exiting the air escape conduits 122c and 124c contacts the water as it reaches the apexes of the first and second ramps 122 and 124 with a relatively high velocity component in the direction perpendicular to the central axis $A_V$. Since the water already has momentum in the direction perpendicular to the central axis $A_V$, the pressure required to disperse the water off of the ramp outer surfaces 122a and 124a is relatively low.

Figure 3:
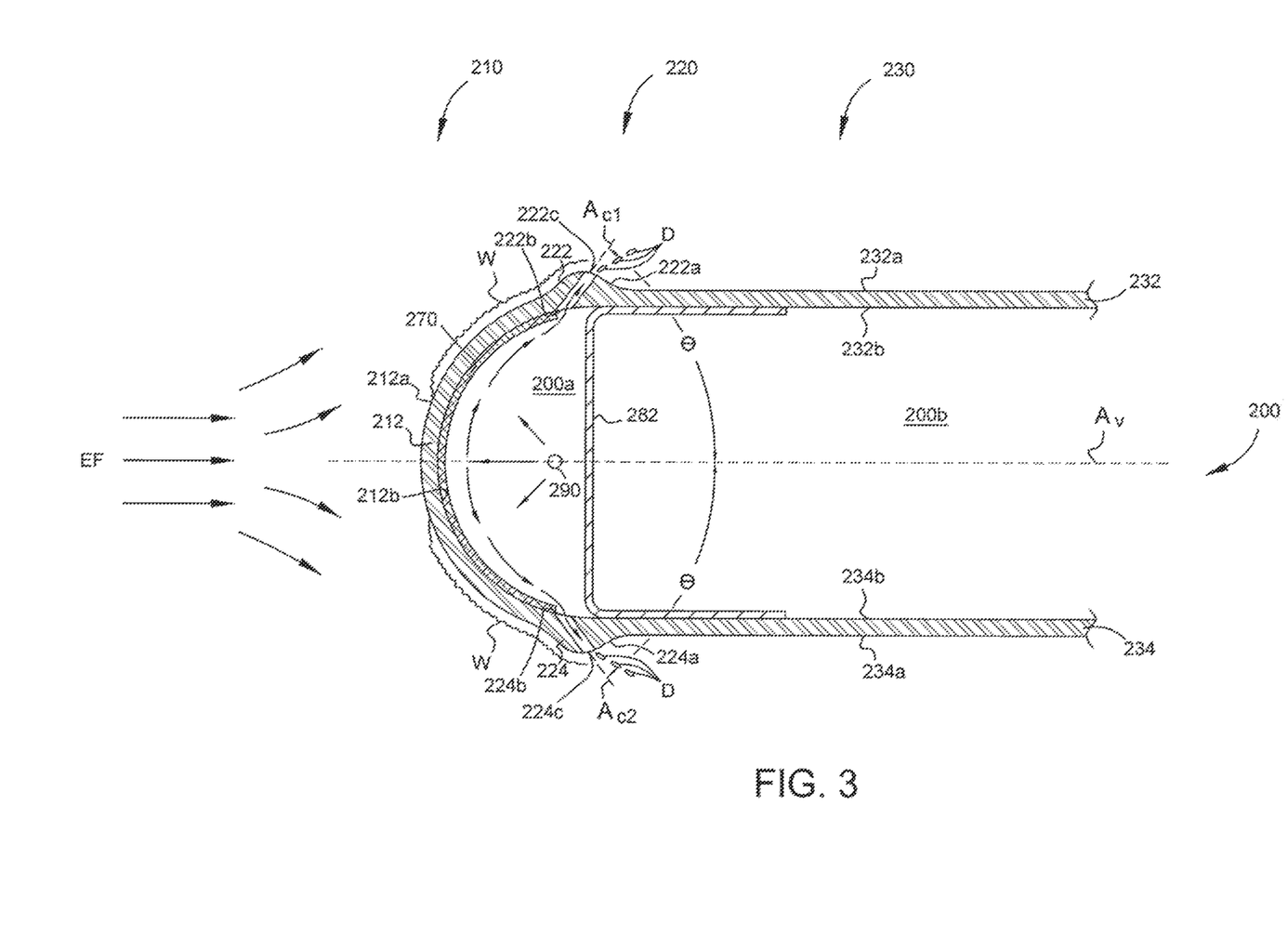
FIG. 3 is a partial cross-sectional view of another example embodiment of the anti-icing aircraft engine inlet guide vane of another embodiment of the aircraft anti-icing system of the present disclosure.

FIG. 3 is a partial cross-sectional view of another example embodiment of the inlet guide vane 200 of another embodiment of the aircraft anti-icing system of the present disclosure. The cross-section is taken along a plane perpendicular to the radial dimension of the guide vane 200. In this embodiment, the guide vane 200 has a uniform cross-section along its radial dimension (though the cross-section of the guide vane may vary along its radial dimension in other embodiments).

The guide vane 200 includes a leading edge member 210, a body member (not shown), a trailing edge member (not shown), a heating device 270, a sealing component 282, and an air director 290. The leading edge member 210, the body member, and the trailing edge member are connected to one another to define an interior cavity within the guide vane 200. As described below, the sealing component 282 is configured, positioned, and oriented to divide the interior cavity into a plenum 200a and a cavity 200b.

The leading edge member 210 includes a curved leading edge 212, a first ramp 222, a second ramp 224, and first and second opposing sidewalls 232 and 234. The leading edge 212 has a convex leading edge outer surface 212a and a concave leading edge inner surface 212b and extends along the radial dimension of the guide vane 200 (i.e., into and out of the page with respect to the orientation shown in FIG. 3). The first and second ramps 222 and 224 and the first and second side walls 232 and 234 also extend along the radial dimension of the guide vane 100.

The first ramp 222 includes a first ramp outer surface 222a and a first ramp inner surface 222b. The first ramp 222 includes a suitably shaped and sized surface (not labeled) that defines a first air escape conduit 222c between the first ramp inner and outer surfaces 222a and 222b. The first air escape conduit 222c is in fluid communication with the plenum 200a and the atmosphere (and thus fluidly connects the plenum 200a to the atmosphere). The first air escape conduit 222c has a longitudinal axis $A_{C1}$ that forms an angle θ with respect to a central axis $A_V$ of the guide vane 200. For the purposes of this example embodiment, the central axis $A_V$ is an axis that laterally bisects the guide vane 200 and extends from the lateral center of the leading edge 212 of the guide vane 200 (which is its apex as shown in FIG. 3) to the lateral center of the trailing edge of the guide vane 200 (not shown) (also called the mean camber line). The angle θ may be any suitable angle of 90 degrees or less. In certain embodiments, the angle θ is less than 25 degrees. Put differently, the first air escape conduit 222c is angled axially rearward.

The second ramp 224 includes a second ramp outer surface 224a and a second ramp inner surface 224b. The second ramp 224 includes a suitably shaped and sized surface (not labeled) that defines a second air escape conduit 224c between the second ramp inner and outer surfaces 224a and 224b. The second air escape conduit 224c is in fluid communication with the plenum 200a and the atmosphere (and thus fluidly connects the plenum 200a to the atmosphere). The second air escape conduit 224c has a longitudinal axis $A_{C2}$ that forms the angle θ with respect to the central axis $A_V$ of the guide vane 200. Put differently, the second air escape conduit 224c is angled axially rearward. In other embodiments, the longitudinal axes of the first and second air escape conduits form different angles with respect to the central axis of the guide vane.

Each air escape conduit may extend any suitable length along the radial direction of the guide vane. For instance, an air escape conduit may extend along substantially the entire radial distance of the guide vane to form a generally continuous slot. In other embodiments, the ramps include multiple suitably sized and shaped surfaces along their respective radial dimensions that define additional air escape conduits spaced apart at suitable intervals. The cross sections of the air escape conduits may take any suitable shape, such as a circular shape, an oval shape, or a rectangular shape. In some embodiments, the air escape conduits taper outward moving from the ramp inner surface to the ramp outer surface such that the air escape conduit inlet has a smaller area than the air escape conduit outlet (or vice-versa).

The first side wall 232 includes a first side wall outer surface 232a and a first side wall inner surface 232b. The second side wall 234 includes a second side wall outer surface 234a and a second side wall inner surface 234b.

In this example embodiment, the leading edge 212, the first and second ramps 222 and 224, and the first and second sidewalls 232 and 234 are integrally formed (though in other embodiments some or all of these portions may be separate components attached to one another in any suitable manner). Also, in this example embodiment, the leading edge member 210, the body member, and the trailing edge member are integrally formed with one another (though in other embodiments some or all of these portions may be separate components attached to one another in any suitable manner).

On one side of the central axis $A_V$ of the guide vane 200, the leading edge outer surface 212a transitions into the first ramp outer surface 222a, which transitions into the first side wall outer surface 232a, which transitions into a trailing edge outer surface (not shown). Similarly, on the other side of the central axis $A_V$ of the guide vane 200, the leading edge outer surface 212a transitions into the second ramp outer surface 224a, which transitions into the second side wall outer surface 234a, which transitions into the trailing edge outer surface. These outer surfaces collectively form a vane outer surface, and are integrally formed with one another in this example embodiment (though they may not be in other embodiments). On one side of the central axis $A_V$ of the guide vane 200, the leading edge inner surface 212b transitions into the first ramp inner surface 222b, which transitions into the first side wall inner surface 232b, which transitions into a trailing edge inner surface. Similarly, on the other side of the central axis $A_V$ of the guide vane 200, the leading edge inner surface 212b transitions into the second ramp inner surface 224b, which transitions into the second side wall inner surface 234b, which transitions into the trailing edge inner surface. These inner surfaces collectively form a vane inner surface, and are integrally formed with one another in this example embodiment (though they may not be in other embodiments).

The first ramp outer surface 222a extends outward from the leading edge outer surface 212a and the first side wall outer surface 232a to form a first ramp apex (not labeled). The distance between the first ramp inner surface 222b and the first ramp apex when measured perpendicularly from the first ramp inner surface 222b is greater than the distance between the leading edge inner surface 212b and the leading edge outer surface 212a and the distance between the first side wall inner surface 232a and the first side wall outer surface 232b. Put differently, the thickness of the first ramp 222 measured at its apex is greater than the thickness of the leading edge 212 and the thickness of the first side wall 232.

The second ramp outer surface 224a extends outward from the leading edge outer surface 212a and the second side wall outer surface 234a to form a second ramp apex (not labeled). The distance between the second ramp inner surface 224b and the second ramp apex when measured perpendicularly from the second ramp inner surface 224b is greater than the distance between the leading edge inner surface 212b and the leading edge outer surface 212a and the distance between the second side wall inner surface 234a and the second side wall outer surface 234b. Put differently, the thickness of the second ramp 224 measured at its apex is greater than the thickness of the leading edge 212 and the thickness of the second side wall 234.

The heating device 270 is a suitable electrically-controlled heating device, such as an electric heating mat, and is positioned within the plenum such that it is in thermal communication with (and in this example embodiment, directly contacts) the leading edge inner surface 212b along its radial dimension. The heating device 270 is electrically connected to a suitable power source to power the heating device 270. The heating device 270 is also communicatively connected to a suitable controller configured to control the heating device 270 (e.g., switch it between on and off states and, if necessary, change the temperature to which it heats). The heating device 270 is the heat source of this example embodiment of the aircraft anti-icing system.

The sealing component 282 is disposed between and sealingly engages the first side wall inner surface 232b and the second side wall inner surface 234b and is oriented such that its longitudinal axis extends along the radial dimension of the guide vane 200. This configuration forms the plenum 200a and the cavity 200b, which are not in fluid communication with one another (though they may be in other embodiments).

The air director 290 defines an air inlet (not shown) that is fluidly connectable to a pressurized air supply (not shown), which is the pressurized air source of this example embodiment of the aircraft anti-icing system. The air director 290 also defines an air outlet that is in fluid communication with the plenum 200a (but not with the cavity 200b). In this example embodiment, the pressurized air supply is bleed air directed from the engine via suitable tubing, valves, and other devices as is known in the art. In other embodiments, rather than use engine bleed air as the pressurized air supply, the aircraft includes suitable devices configured to generate the requisite pressurized air. In this embodiment, as described below, the air need not be hot enough to heat the leading edge 212 enough to prevent ice from forming on its outer surface 212a since the heating device 270 is used.

In operation, when the aircraft is flying in conditions that render the guide vane 200 susceptible to ice formation and build-up, an operator controls the heating device 270 to turn on and fluidly connects the air director 290 to the pressurized air supply to enable the air (such as the engine bleed air) to flow into the air director 290. The heating device 270 heats the leading edge inner surface 212b via conduction. The heating device 270 reaches a temperature high enough to heat the leading edge outer surface 212a to cause any ice already formed on the leading edge outer surface 212a to melt into water W that accumulates on the leading edge outer surface 212a. While this occurs, the atmospheric conditions as well as the conditions in the plenum 200a typically cause additional water W to accumulate on the leading edge outer surface 212a rather than freezing.

Meanwhile, the pressurized air travels through the air director 290 into the plenum 200a to pressurize the plenum 200a. From there, the air flows along the curvature of the leading edge inner surface 212b toward the first and second ramp inner surfaces 222b and 224b before exiting the plenum 200a through the first and second air escape conduits 222c and 224c to the atmosphere.

In this example embodiment, the ramp outer surfaces 222a and 224a are sized, oriented, and positioned (e.g., extend substantially along the radial dimension of the guide vane) such that the water W cannot travel around the ramps to avoid crossing paths with the air escaping from the first and second air escape conduits 222c and 224c (described below). The air escape conduits 222c and 224c are sized, oriented, and positioned such that the water W reaches exit apertures of the air escape conduits 222c and 224c before it freezes along the leading edge outer surface 212a, the first ramp outer surface 222a, or the second ramp outer surface 224a. The air exiting the plenum 200a through the exit apertures of the air escape conduits 222c and 224c forces the water W off of the first and second ramp outer surfaces 222a and 224a and becomes entrained in the external flow as droplets D, which flow downstream through the turbomachinery.

The aircraft anti-icing system including the guide vane 200 solves the above-described problems. The use of the heating device 270 to directly heat the leading edge 212 melts existing ice on and/or prevents ice formation on the leading edge outer surface 212a. Also, enabling the pressurized air to escape the plenum 200a via the first and second air escape conduits 222c and 224c so that it forces water off of the outer surface of the guide vane (and into the external air flow) as the water travels downstream from the leading edge outer surface 212a toward the trailing edge prevents runback ice formation. The geometry of the first and second ramp outer surfaces 222a and 224a along with the location of the air escape conduits 222c and 224c relative to the first and second ramp outer surfaces 222a and 224a aids in dispersing the water off of the first and second ramp outer surfaces 222a and 224a, as explained above.

In variations of the above-described embodiments, the ramps do not define air escape conduits. In these embodiments, the ramps are sloped in such a way so as to cause the external flow to force the water off of the ramps without the aid of pressurized air exiting the plenum.

Figure 4:
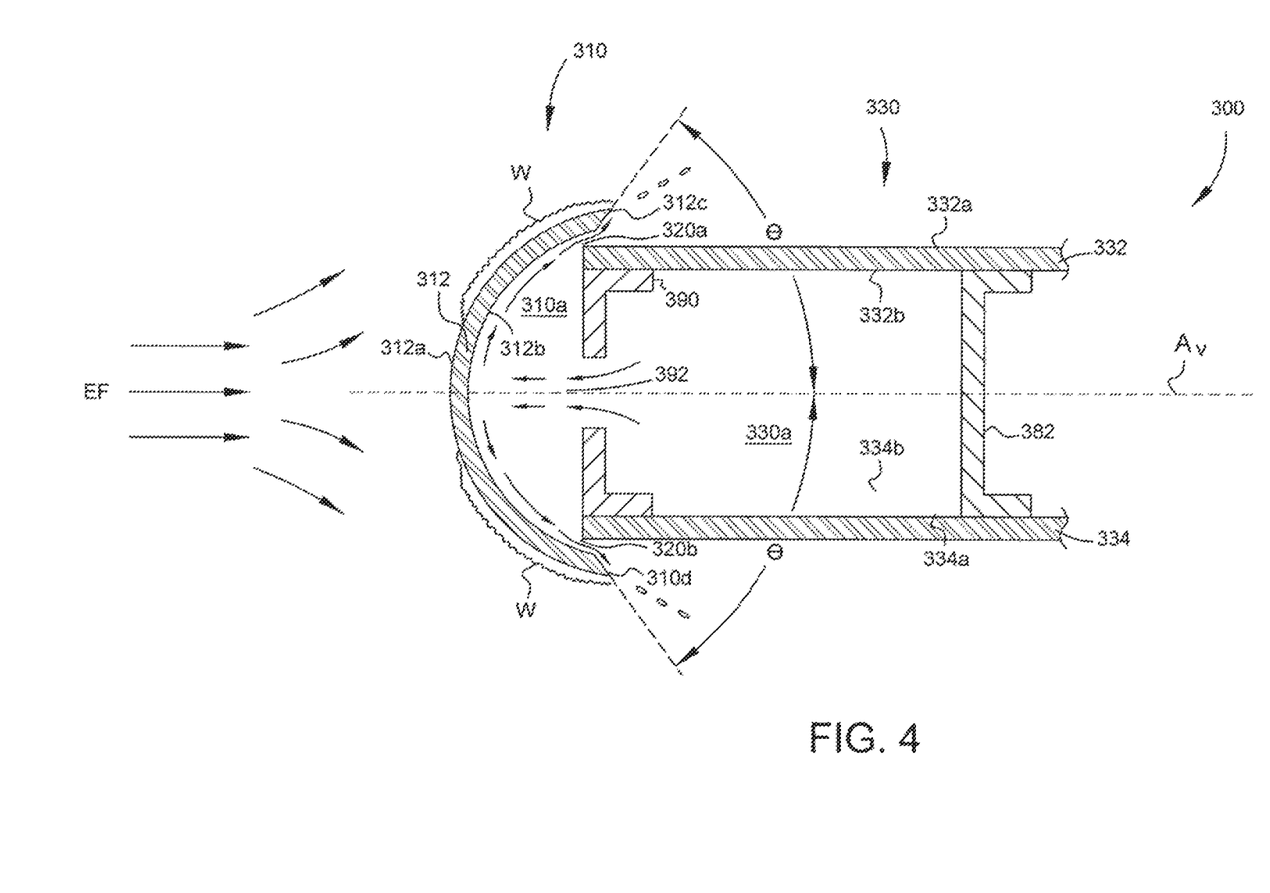
FIG. 4 is a partial cross-sectional view of another example embodiment of the anti-icing aircraft engine inlet guide vane of another embodiment of the aircraft anti-icing system the present disclosure.

FIG. 4 is a partial cross-sectional view of another example embodiment of the inlet guide vane 300 of another embodiment of the aircraft anti-icing system of the present disclosure. The cross-section is taken along a plane perpendicular to the radial dimension of the guide vane 300. In this embodiment, the guide vane 300 has a uniform cross-section along its radial dimension (though the cross-section of the guide vane may vary along its radial dimension in other embodiments).

The guide vane 300 includes a leading edge member 310, a body member (not shown), a trailing edge member (not shown), a sealing component 382, and an air director 390. The leading edge member 310, the body member, and the trailing edge member are connected to one another to define an interior cavity within the guide vane 300. As described below, the sealing component 382 and the air director 390 are configured, positioned, and oriented to divide the interior cavity into a plenum 310a and a cavity 330a.

The leading edge member 310 includes a curved leading edge 312, and first and second opposing side walls 332 and 334. The leading edge 312 extends along the radial dimension of the guide vane 300 and has a convex leading edge outer surface 312a and a concave leading edge inner surface 312b that are connected by leading edge end surfaces 310c and 310d. The leading edge end surfaces 312c and 312d form an angle $\theta$ with respect to a central axis $A_V$ of the guide vane 300. For the purposes of this example embodiment, the central axis $A_V$ is an axis that laterally bisects the guide vane 300 and extends from the lateral center of the leading edge 312 of the guide vane 300 (which is its apex as shown in FIG. 4) to the lateral center of the trailing edge of the guide vane 300 (not shown) (also called the mean camber line). The angle $\theta$ may be any suitable angle of 90 degrees or less. In certain embodiments, the angle $\theta$ is less than 25 degrees.

The first and second opposing side walls 332 and 334 extend along the radial dimension of the guide vane 300. The first side wall 332 includes a first side wall outer surface 332a and a first side wall inner surface 332b. The second side wall 334 includes a second side wall outer surface 334a and a second side wall inner surface 334b.

The leading edge 312 is attached to the first and second sidewalls 332 and 334 in a suitable manner such that air escape conduits 320a and 320b are defined therebetween. Put differently, the air escape conduits 320a and 320b are angled axially rearward. The air escape conduits 320a and 320b are in fluid communication with the plenum 310a and the atmosphere (and thus fluidly connect the plenum 310a to the atmosphere). In this example embodiment, the body member and the trailing edge member are integrally formed with one another (though in other embodiments some or all of these portions may be separate components attached to one another in any suitable manner). Further, the air escape conduits 320a and 320b generally form slots that extend along the radial dimension of the guide vane.

The sealing component 382 is disposed between and sealingly engages the first side wall inner surface 332b and the second side wall inner surface 334b and is oriented such that its longitudinal axis extends along the radial dimension of the guide vane 300. The air director 390 is disposed between and sealingly engages the first side wall inner surface 332b and the second side wall inner surface 334b and is oriented such that its longitudinal axis extends along the radial dimension of the guide vane 300. The air director 390 is positioned between the leading edge inner surface 312b and the sealing component 382. This configuration forms the plenum 310a and the cavity 330b, which are in fluid communication with one another.

The air director 390 defines a hot air inlet (not shown) that is fluidly connectable to a pressurized hot air supply (not shown), which is the pressurized air source and the heat source of this example embodiment of the aircraft anti-icing system. The air director 390 also includes suitably sized and shaped surfaces that define a hot air outlet 392 (or multiple hot air outlets) that is in fluid communication with the plenum 310a. The air director may include any suitable quantity of one or more hot air outlets positioned in any suitable manner along its radial dimension and that take any suitable shape and size. In this example embodiment, the pressurized hot air supply is bleed air directed from the engine via suitable tubing, valves, and other devices as is known in the art. In other embodiments, rather than use engine bleed air as the pressurized hot air supply, the aircraft includes a pump, a heating device, and other suitable devices configured to generate the requisite pressurized hot air.

In operation, when the aircraft is flying in conditions that render the guide vane 300 susceptible to ice formation and build-up, an operator fluidly connects the air director 390 to the pressurized hot air supply, such as by controlling a suitable valve to open to enable the hot air (such as the engine bleed air) to flow into the air director 390. The hot air travels through the air director 390 and exits the air director 390 through the hot air outlet 392 into the plenum 310a. The pressure of the hot air is high enough to cause the hot air to fill the plenum 310a and impinge onto the leading edge inner surface 312b. From there, the hot air flows along the curvature of the leading edge inner surface 312b before exiting the plenum 310a through the air escape conduits 320a and 320b to the atmosphere.

While in the plenum 310a, the hot air heats the leading edge inner surface 312b via convection. The temperature of the hot air is high enough to heat the leading edge outer surface 312a to cause any ice already formed on the leading edge outer surface 312a to melt into water W that accumulates on the leading edge outer surface 312a. While the pressurized hot air supply is fluidly connected to the air director 390, the atmospheric conditions as well as the conditions in the plenum 310a typically cause additional water W to accumulate on the leading edge outer surface 312a rather than freezing. As the aircraft continues moving, the water W that accumulates on the leading edge outer surface 312a is forced downstream along the leading edge outer surface 312a toward the air escape conduits 320a and 320b.

The air escape conduits 320a and 320b are sized, oriented, and positioned such that the water W reaches exit apertures of the air escape conduits 320a and 320b before it freezes along the leading edge outer surface 312a. The air exiting the plenum 310a through the exit apertures of the air escape conduits 320a and 320b forms a boundary layer of air along part of the vane outer surface and forces the water W off of the leading edge outer surface 312a and becomes entrained in the external flow as droplets D, which flow downstream through the turbomachinery.

The aircraft anti-icing system including the guide vane 300 solves the above-described problems. The use of the air director 390 to direct hot air into the plenum 310a heats the leading edge 312 to melt existing ice on and/or prevent ice formation on the leading edge outer surface 312a. Also, enabling the pressurized hot air to escape the plenum 310a via the air escape conduits 320a and 320b so that it forces water off of the outer surface of the guide vane (and into the external air flow) as the water travels downstream from the leading edge outer surface 312a toward the trailing edge prevents runback ice formation.

Figure 5A:
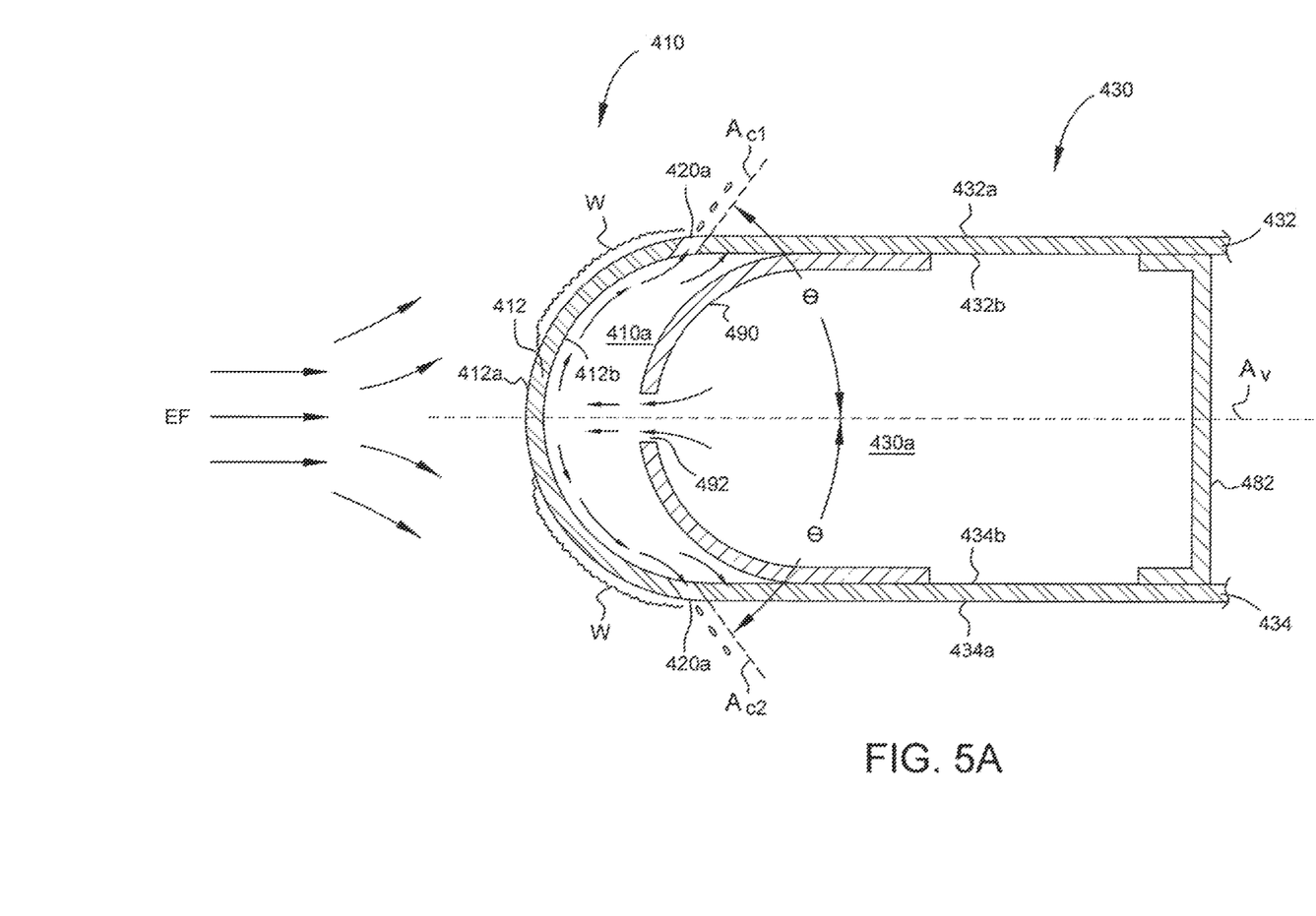
FIG. 5A is a partial cross-sectional view of another example embodiment of the anti-icing aircraft engine inlet guide vane of another embodiment of the aircraft anti-icing system the present disclosure.

FIG. 5A is a partial cross-sectional view of another example embodiment of the inlet guide vane 400 of another embodiment of the aircraft anti-icing system of the present disclosure. The cross-section is taken along a plane perpendicular to the radial dimension of the guide vane 400. In this embodiment, the guide vane 400 has a uniform cross-section along its radial dimension (though the cross-section of the guide vane may vary along its radial dimension in other embodiments).

The guide vane 400 includes a leading edge member 410, a body member (not shown), a trailing edge member (not shown), a sealing component 482, and an air director 490. The leading edge member 410, the body member, and the trailing edge member are connected to one another to define an interior cavity within the guide vane 400. As described below, the sealing component 482 and the air director 490 are configured, positioned, and oriented to divide the interior cavity into a plenum 410a and a cavity 430a.

The leading edge member 410 includes a curved leading edge 412 and first and second sidewalls 432 and 434. The leading edge 412 has a convex leading edge outer surface 412a and a concave leading edge inner surface 412b. The leading edge 412 extends along the radial dimension of the guide vane 400. The leading edge 412 includes suitably shaped and sized surfaces (not labeled) that define multiple air escape conduits 420a and 420b between the leading edge inner and outer surfaces 412b and 412a. The air escape conduits 420a and 420b are in fluid communication with the plenum 410a and the atmosphere (and thus fluidly connects the plenum 410a to the atmosphere).

Figure 5B:
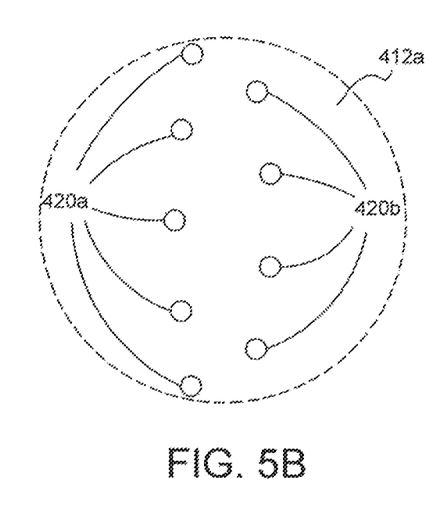
FIG. 5B is a partial view of the outer vane surface of the anti-icing aircraft engine inlet guide vane of FIG. 5A showing the array of exit apertures of the air escape conduits.

The outlets of the air escape conduits 420a are spaced-apart and generally aligned along the radial dimension of the guide vane at a first distance from the lateral center of the leading edge 412 along a central axis $A_V$ of the guide vane 400. The outlets of the air escape conduits 420b are spaced-apart and generally aligned along the radial dimension of the guide vane at a second, greater distance from the lateral center of the leading edge 412 along the central axis $A_V$. As best shown in FIG. 4B, the outlets of the air escape conduits 420b are positioned between the outlets of the air escape conduits 420b along the radial dimension of the guide vane 400. For the purposes of this example embodiment, the central axis $A_V$ is an axis that laterally bisects the guide vane 400 and extends from the lateral center of the leading edge 412 of the guide vane 400 (which is its apex as shown in FIG. 5A) to the lateral center of the trailing edge of the guide vane 400 (not shown) (also called the mean camber line).

The air escape conduits 420a and 420b have longitudinal axes $A_{C1}$ and $A_{C2}$, respectively, that form an angle θ with respect to the central axis $A_V$ of the guide vane 400 The angle θ may be any suitable angle of 90 degrees or less. In certain embodiments, the angle θ is less than 25 degrees. Put differently, the air escape conduits 420a and 420b are angled axially rearward.

The first and second opposing side walls 432 and 434 extend along the radial dimension of the guide vane 400. The first side wall 432 includes a first side wall outer surface 432a and a first side wall inner surface 432b. The second side wall 434 includes a second side wall outer surface 434a and a second side wall inner surface 434b.

In this example embodiment, the leading edge member 412 and the first and second sidewalls 432 and 434 are integrally formed with one another (though in other embodiments some or all of these portions may be separate components attached to one another in any suitable manner). In this example embodiment, the leading edge member 410, the body member, and the trailing edge member are integrally formed with one another (though in other embodiments some or all of these portions may be separate components attached to one another in any suitable manner).

On one side of the central axis $A_V$ of the guide vane 400, the leading edge outer surface 412a transitions into the first side wall outer surface 432a, which transitions into a trailing edge outer surface (not shown). Similarly, on the other side of the central axis $A_V$ of the guide vane 400, the leading edge outer surface 412a transitions into the second side wall outer surface 434a, which transitions into the trailing edge outer surface. These outer surfaces collectively form a vane outer surface, and are integrally formed with one another in this example embodiment (though they may not be in other embodiments). On one side of the central axis $A_V$ of the guide vane 400, the leading edge inner surface 412b transitions into the first side wall inner surface 432b, which transitions into a trailing edge inner surface. Similarly, on the other side of the central axis $A_V$ of the guide vane 400, the leading edge inner surface 412b transitions into the second side wall inner surface 434b, which transitions into the trailing edge inner surface. These inner surfaces collectively form a vane inner surface, and are integrally formed with one another in this example embodiment (though they may not be in other embodiments).

The sealing component 482 is disposed between and sealingly engages the first side wall inner surface 432b and the second side wall inner surface 434b and is oriented such that its longitudinal axis extends along the radial dimension of the guide vane 400. The air director 490 is disposed between and sealingly engages the first side wall inner surface 432b and the second side wall inner surface 434b and is oriented such that its longitudinal axis extends along the radial dimension of the guide vane 400. The air director 490 is positioned between the leading edge inner surface 412b and the sealing component 482. This configuration forms the plenum 410a and the cavity 430b, which are in fluid communication with one another.

The air director 490 defines a hot air inlet (not shown) that is fluidly connectable to a pressurized hot air supply (not shown), which is the pressurized air source and the heat source of this example embodiment of the aircraft anti-icing system. The air director 490 also includes suitably sized and shaped surfaces (not shown) that define a hot air outlet 492 (or multiple hot air outlets) that are in fluid communication with the plenum 410a. The air director may include any suitable quantity of one or more hot air outlets positioned in any suitable manner along its radial dimension and that take any suitable shape and size. In this example embodiment, the pressurized hot air supply is bleed air directed from the engine via suitable tubing, valves, and other devices as is known in the art. In other embodiments, rather than use engine bleed air as the pressurized hot air supply, the aircraft includes a pump, a heating device, and other suitable devices configured to generate the requisite pressurized hot air.

In operation, when the aircraft is flying in conditions that render the guide vane 400 susceptible to ice formation and build-up, an operator fluidly connects the air director 490 to the pressurized hot air supply, such as by controlling a suitable valve to open to enable the hot air (such as the engine bleed air) to flow into the air director 490. The hot air travels through the air director 490 and exits the air director 490 through the hot air outlet 492 into the plenum 410a. The pressure of the hot air is high enough to cause the hot air to fill the plenum 410a and impinge onto the leading edge inner surface 412b. From there, the hot air flows along the curvature of the leading edge inner surface 412b before exiting the plenum 410a through the air escape conduits 420a and 420b to the atmosphere.

While in the plenum 410a, the hot air heats the leading edge inner surface 412b via convection. The temperature of the hot air is high enough to heat the leading edge outer surface 412a to cause any ice already formed on the leading edge outer surface 412a to melt into water W that accumulates on the leading edge outer surface 412a. While the pressurized hot air supply is fluidly connected to the air director 490, the atmospheric conditions as well as the conditions in the plenum 410a typically cause additional water W to accumulate on the leading edge outer surface 412a rather than freezing. As the aircraft continues moving, the water W that accumulates on the leading edge outer surface 412a is forced downstream along the leading edge outer surface 412a toward the air escape conduits 420a and 420b.

The air escape conduits 420a and 420b are sized, oriented, and positioned such that the water W reaches exit apertures of the air escape conduits 420a and 420b before it freezes along the leading edge outer surface 412a. The air exiting the plenum 410a through the exit apertures of the air escape conduits 420a and 420b forces the water W off of the leading edge outer surface 412a and becomes entrained in the external flow as droplets D, which flow downstream through the turbomachinery.

The aircraft anti-icing system including the guide vane 400 solves the above-described problems. The use of the air director 490 to direct hot air into the plenum 410a heats the leading edge 412 to melt existing ice on and/or prevent ice formation on the leading edge outer surface 412a. Also, enabling the pressurized hot air to escape the plenum 410a via the air escape conduits 420a and 420b so that it forces water off of the outer surface of the guide vane (and into the external air flow) as the water travels downstream from the leading edge outer surface 412a toward the trailing edge prevents runback ice formation.

In certain embodiments, the guide vane includes icephobic and/or water-phobic coatings to help prevent ice formation and to aid the flow of water toward the air escape openings.

The anti-icing features of the guide vane—namely, the use of the air director to direct air into the plenum to heat the leading edge and the use of the air escape conduits to direct that air externally to force water off of the outer surface of the guide vane—may be applied to a variety of other components of the aircraft. For instance, these features may be adapted for the wing of the aircraft to prevent ice formation and build-up on its leading edge and runback ice formation, the inlet cowl of the nacelle (which includes an annular leading edge member having a radially outward facing exterior surface and a radially inward facing exterior surface with a cross-section similar to those show in FIGS. 2-5A) of the aircraft to prevent ice formation and build-up on its leading edge and runback ice formation, or any other suitable components.

Various embodiments of an aircraft engine inlet component comprise a leading edge having an exterior surface and an interior surface, a plenum at least partially bound by the interior surface of the leading edge, and a conduit defining a fluid flowpath between the plenum and the exterior surface of the leading edge. The plenum is fluidly connectable to a pressurized air source.

In one such embodiment, the conduit comprises an axially forward surface that forms an acute angle with the exterior surface of the leading edge where the conduit intersects the exterior surface of the leading edge.

In another such embodiment, the exterior surface of the leading edge forms a ramp upstream of and adjacent to the conduit.

In another such embodiment, the pressurized air source comprises a heated pressurized air source.

In another such embodiment, the aircraft engine inlet component further comprises a heating device in thermal communication with the leading edge.

In another such embodiment, the heating device is within the plenum and contacts the interior surface of the leading edge.

In another such embodiment, the aircraft engine inlet component comprises an inlet cowl of a nacelle, and the exterior surface of the leading edge comprises a radially inward facing portion and a radially outward facing portion.

In another such embodiment, the conduit defines the fluid flowpath between the plenum and the radially outward facing portion of the exterior surface of the leading edge, and the aircraft engine inlet component further comprises a second conduit defining a second fluid flowpath between the plenum and the radially inward facing portion of the exterior surface of the leading edge.

In another such embodiment, the aircraft engine inlet component further comprises multiple conduits each defining a fluid flowpath between the plenum and the exterior surface of the leading edge, wherein the conduits each terminate in an exit aperture. The exit apertures collectively form an array in the leading edge.

In another such embodiment, the conduits extend from the plenum through the leading edge at an axially rearward angle.

In another such embodiment, the aircraft engine inlet component comprises an inlet guide vane, and the leading edge comprises a pressure-side portion and a suction-side portion and extends radially from an inner band to an outer band.

In another such embodiment, the conduit defines the fluid flowpath between the plenum and the exterior surface of the leading edge adjacent the pressure-side portion, and the aircraft engine inlet component further comprises a second conduit defining a fluid flowpath between the plenum and the exterior surface of the leading edge adjacent the suction-side portion.

In another such embodiment, the exterior surface of the leading edge forms one or more ramps upstream of and adjacent to the conduits.

In another such embodiment, each conduit comprises an axially forward surface that forms an acute angle with the exterior surface of the leading edge where the conduit intersects the exterior surface of the leading edge.

In another such embodiment, each conduit comprises an axially forward surface that forms an acute angle with the exterior surface of the leading edge where the conduit intersects the exterior surface of the leading edge.

In another such embodiment, the conduits each terminate in an exit aperture, wherein the exit apertures collectively form an array in the leading edge.

Various embodiments of a system for melting ice or preventing ice formation comprises a pressurized air source and an aircraft engine inlet component. The aircraft engine inlet component comprises a leading edge comprising an apex, a first surface extending downstream from the apex, and a second surface extending downstream from the apex, a plenum at least partially bound by the leading edge and in fluid communication with the pressurized air source to receive pressurized air from the pressurized air source, and a conduit defining a fluid flowpath between the plenum and the exterior of the component to enable the pressurized air to escape from the plenum to the exterior of the component, the conduit intersecting the first surface of the leading edge.

In one such embodiment, the conduit comprises an axially forward surface that forms an acute angle with the first surface of the leading edge where the conduit intersects the first surface of the leading edge.

In another such embodiment, the first surface of the leading edge forms a ramp upstream of and adjacent to the conduit.

In another such embodiment, the pressurized air source comprises a heated pressurized air source.

In another such embodiment, the system further comprises a heating device in thermal communication with the leading edge.

In another such embodiment, the heating device is within the plenum and contacts the leading edge.

In another such embodiment, the aircraft engine inlet component comprises an inlet cowl of a nacelle, and the first surface of the leading edge comprises a radially outward facing surface and the second surface of the leading edge comprises a radially inward facing surface.

In another such embodiment, the system further comprises a second conduit defining a second fluid flowpath between the plenum and the exterior of the component to enable the pressurized air to escape from the plenum to the exterior of the component, the conduit intersecting the second surface of the leading edge.

In another such embodiment, the aircraft engine inlet component further comprises multiple conduits each defining a fluid flowpath between the plenum and the exterior of the component, and wherein the conduits each terminate in an exit aperture, wherein the exit apertures collectively form an array in the leading edge.

In another such embodiment, the conduits extend from the plenum through the leading edge at an axially rearward angle.

In another such embodiment, the aircraft engine inlet component comprises an inlet guide vane, and the leading edge comprises a pressure-side portion and a suction-side portion and extends radially from an inner band to an outer band.

In another such embodiment, the conduit defines the fluid flowpath between the plenum and the exterior of the component adjacent the pressure-side portion, and the system further comprises a second conduit defining a fluid flowpath between the plenum and the exterior of the component adjacent the suction-side portion.

In another such embodiment, the first surface of the leading edge forms one or more ramps upstream of and adjacent to the conduits.

In another such embodiment, each conduit comprises an axially forward surface that forms an acute angle with the first surface of the leading edge where the conduit intersects the first surface of the leading edge.

In another such embodiment, each conduit comprises an axially forward surface that forms an acute angle with the first surface of the leading edge where the conduit intersects the first surface of the leading edge.

In another such embodiment, the conduits each terminate in an exit aperture, wherein the exit apertures collectively form an array in the leading edge.

Various embodiments of an aircraft engine inlet component comprise a leading edge comprising a leading edge outer surface and a leading edge inner surface, a first side wall connected to the leading edge, a second side wall opposite the first side wall and connected to the leading edge, and an air director having an inlet and an outlet. The leading edge and the first and second side walls at least partially form an interior vane cavity including a plenum adjacent the leading edge inner surface. The outlet of the air director is in fluid communication with the plenum. The plenum is in fluid communication with the atmosphere via a first conduit adjacent the first side wall and a second conduit adjacent the second side wall.

In one such embodiment, the inlet of the air director is fluidly connectable to a pressurized hot air source such that, when fluidly connected to the pressurized hot air source, hot air can flow from the hot air source into the air director via the inlet of the air director, from the air director to the plenum via the outlet of the air director, and from the plenum to the atmosphere via the first and second conduits.

In another such embodiment, the aircraft engine inlet component further comprises a first ramp upstream of the first conduit.

In another such embodiment, the leading edge, the first ramp, and the first side wall are integrally formed.

In another such embodiment, the first ramp comprises a first ramp inner surface, a first ramp outer surface, and a first ramp conduit surface that defines the first conduit, which extends from the first ramp inner surface to the first ramp outer surface.

In another such embodiment, the first ramp outer surface forms a first ramp apex that is spaced apart from the leading edge outer surface in a direction perpendicular to the leading edge outer surface where the leading edge outer surface meets the first ramp outer surface.

In another such embodiment, the first conduit intersects the first ramp apex.

In another such embodiment, the aircraft engine inlet component further comprises a heating device within the plenum and in thermal communication with the leading edge inner surface, and the heating device is operable to transfer heat to the leading edge inner surface.

In another such embodiment, the inlet of the air director is fluidly connectable to a pressurized air source such that, when fluidly connected to the pressurized air source, air can flow from the air source into the air director via the inlet of the air director, from the air director to the plenum via the outlet of the air director, and from the plenum to the atmosphere via the first and second conduits.

In another such embodiment, the aircraft engine inlet component further comprises a first ramp upstream of the first conduit.

In another such embodiment, the first ramp comprises a first ramp inner surface, a first ramp outer surface, and a first ramp conduit surface that defines the first conduit, which extends from the first ramp inner surface to the first ramp outer surface.

In another such embodiment, the first ramp outer surface forms a first ramp apex that is spaced apart from the leading edge outer surface in a direction perpendicular to the leading edge outer surface where the leading edge outer surface meets the first ramp outer surface.

In another such embodiment, the first conduit intersects the first ramp apex.

In another such embodiment, the first and second side walls are connected to the leading edge such that the first conduit is defined between the leading edge and the first side wall and the second conduit is defined between the leading edge and the second side wall.

In another such embodiment, the inlet of the air director is fluidly connectable to a pressurized hot air source such that, when fluidly connected to the pressurized hot air source, hot air can flow from the hot air source into the air director via the inlet of the air director, from the air director to the plenum via the outlet of the air director, and from the plenum to the atmosphere via the first and second conduits.

In another such embodiment, the leading edge comprises a concave leading edge inner surface, a convex leading edge outer surface, and a planar leading edge end surface connecting the leading edge inner surface to the leading edge outer surface.

In another such embodiment, the leading edge end surface forms an acute angle relative to an axis that extends between the first and second side walls.

In another such embodiment, the plenum is in fluid communication with the atmosphere via a third conduit adjacent the first side wall and a fourth conduit adjacent the second side wall, each conduit comprising an inlet and an outlet, and the outlets of the third and fourth conduits are positioned a first axial distance from the leading edge and the outlets of the third and fourth conduits are positioned a second, greater axial distance from the leading edge.

In another such embodiment, the outlets of the third and fourth conduits are offset from the outlets of the first and second conduits along a radial dimension of the guide vane.

Various methods for melting ice or preventing ice formation on a leading edge of an aircraft engine inlet component comprise heating the leading edge of the aircraft engine inlet component so that aerodynamic forces effect the flow of water along an exterior surface of the leading edge to an area downstream of an apex of the leading edge and directing air from a plenum within the interior of the aircraft engine inlet component to the area downstream of the apex to force the water away from the exterior surface of the leading edge.

In one such embodiment, the method further comprises heating the air before directing the air from the plenum to the area downstream of the apex.

In another such embodiment, heating the leading edge of the aircraft engine inlet component comprises directing the air to impinge upon an interior surface of the leading edge after heating the air.

In another such embodiment, the air comprises engine bleed air heated by an aircraft engine, further comprising directing the engine bleed air from the engine to the plenum.

In another such embodiment, the method further comprises directing the air from a pressurized air source to the plenum.

In another such embodiment, the method further comprises heating the leading edge via a heating device in thermal communication with the leading edge.

In another such embodiment, the method further comprises directing the air from a pressurized air source to the plenum.

In another such embodiment, directing the air from the plenum to the area downstream of the apex comprises directing the air through a conduit that defines a fluid flowpath between the plenum and the atmosphere.

In another such embodiment, the conduit comprises an axially forward surface that forms an acute angle with an exterior surface of the leading edge where the conduit intersects the exterior surface of the leading edge.

In another such embodiment, the conduit is defined between the leading edge and a side wall.

In another such embodiment, directing the air from the plenum to the area downstream of the apex comprises directing the air through multiple conduits that each define a fluid flowpath between the plenum and the atmosphere.

In another such embodiment, the conduits each terminate in an exit aperture through which the air flows to exit the conduit, wherein the exit apertures collectively form an array in the leading edge.

Various embodiments of a method for melting ice or preventing ice formation on a leading edge of an aircraft engine inlet component comprise heating the leading edge, which comprises a leading edge outer surface and a leading edge inner surface, so that aerodynamic forces effect the flow of water along the leading edge outer surface to an exit aperture of a conduit, the exit aperture positioned downstream of an apex of the leading edge; directing pressurized air into a plenum within the leading edge; and directing the pressurized air from the plenum through the conduit and out of the exit aperture to force the water away from the exterior surface of the leading edge.

In one such embodiment, the method further comprises heating the pressurized air before directing the pressurized air from the plenum through the conduit and out of the exit aperture.

In another such embodiment, heating the leading edge of the aircraft engine inlet component comprises directing the pressurized air to impinge upon the interior surface of the leading edge after heating the pressurized air.

In another such embodiment, the pressurized air comprises engine bleed air heated by an aircraft engine, and the method further comprises directing the engine bleed air from the engine to the plenum.

In another such embodiment, the method further comprises heating the leading edge via a heating device in thermal communication with the interior surface of the leading edge.

In another such embodiment, the conduit comprises an axially forward surface that forms an acute angle with an exterior surface of the leading edge where the conduit intersects the exterior surface of the leading edge.

In another such embodiment, the conduit is defined between the leading edge and a side wall.

Various modifications to the embodiments described herein will be apparent to those skilled in the art. These modifications can be made without departing from the spirit and scope of the present disclosure and without diminishing its intended advantages. It is intended that such changes and modifications be covered by the appended claims.

The invention claimed is:

1. A method for melting ice or preventing ice formation on a leading edge of an aircraft engine inlet component, the method comprising:
   heating the leading edge of the aircraft engine inlet component so that aerodynamic forces effect a flow of water along an exterior surface of the leading edge to an area downstream of an apex of the leading edge; and
   directing air from a plenum within an interior of the aircraft engine inlet component to the area downstream of the apex to force the water away from the exterior surface of the leading edge.

2. The method of claim 1, further comprising heating the air before directing the air from the plenum to the area downstream of the apex.

3. The method of claim 2, wherein heating the leading edge of the aircraft engine inlet component comprises directing the air to impinge upon an interior surface of the leading edge after heating the air.

4. The method of claim 3, wherein the air comprises engine bleed air heated by an aircraft engine, further comprising directing the engine bleed air from the engine to the plenum.

5. The method of claim 2, further comprising directing the air from a pressurized air source to the plenum.

6. The method of claim 1, further comprising heating the leading edge via a heating device in thermal communication with the leading edge.

7. The method of claim 6, further comprising directing the air from a pressurized air source to the plenum.

8. The method of claim 1, wherein directing the air from the plenum to the area downstream of the apex comprises directing the air through a conduit that defines a fluid flowpath between the plenum and the atmosphere.

9. The method of claim 8, wherein the conduit comprises an axially forward surface that forms an acute angle with the exterior surface of the leading edge where the conduit intersects the exterior surface of the leading edge.

10. The method of 8, wherein the conduit is defined between the leading edge and a side wall.

11. The method of claim 1, wherein directing the air from the plenum to the area downstream of the apex comprises directing the air through multiple conduits that each define a fluid flowpath between the plenum and the atmosphere.

12. The method of claim 11, wherein the conduits each terminate in an exit aperture through which the air flows to exit the conduit, wherein the exit apertures collectively form an array in the leading edge.

13. A method for melting ice or preventing ice formation on a leading edge of an aircraft engine inlet component, the method comprising:
   heating the leading edge, which comprises a leading edge outer surface and a leading edge inner surface, so that aerodynamic forces effect a flow of water along the leading edge outer surface to an exit aperture of a conduit, the exit aperture positioned downstream of an apex of the leading edge;
   directing pressurized air into a plenum within the leading edge; and
   directing the pressurized air from the plenum through the conduit and out of the exit aperture to force the water away from the exterior surface of the leading edge.

14. The method of claim 13, further comprising heating the pressurized air before directing the pressurized air from the plenum through the conduit and out of the exit aperture.

15. The method of claim 14, wherein heating the leading edge of the aircraft engine inlet component comprises directing the pressurized air to impinge upon the interior surface of the leading edge after heating the pressurized air.

16. The method of claim 15, wherein the pressurized air comprises engine bleed air heated by an aircraft engine, further comprising directing the engine bleed air from the engine to the plenum.

17. The method of claim 13, further comprising heating the leading edge via a heating device in thermal communication with the interior surface of the leading edge.

18. The method of claim 13, wherein the conduit comprises an axially forward surface that forms an acute angle with the outer surface of the leading edge where the conduit intersects the exterior surface of the leading edge.

19. The method of 18, wherein the conduit is defined between the leading edge and a side wall.

* * * * *